April 23, 1963

J. W. CAHILL 3,086,449

BUILT-IN BARBECUE UNIT

Filed April 17, 1961

INVENTOR.
James William Cahill.
BY
Wood, Herron & Evans.
ATTORNEYS.

April 23, 1963 J. W. CAHILL 3,086,449
BUILT-IN BARBECUE UNIT
Filed April 17, 1961 3 Sheets-Sheet 2

INVENTOR.
James William Cahill.
BY
Wood, Herron & Evans.
ATTORNEYS.

April 23, 1963 J. W. CAHILL 3,086,449
BUILT-IN BARBECUE UNIT
Filed April 17, 1961 3 Sheets-Sheet 3
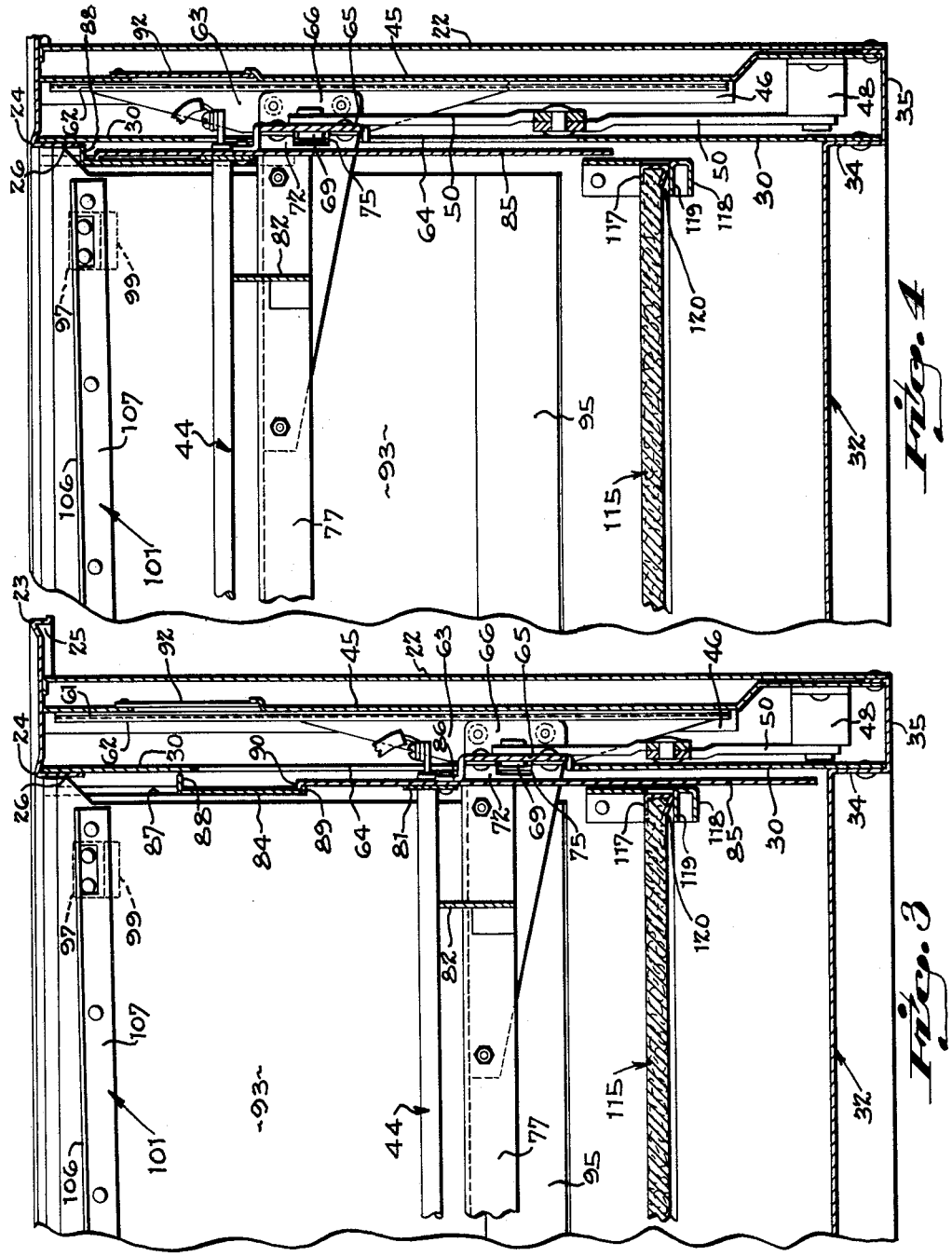
INVENTOR.
James William Cahill.
BY
Wood, Herron & Evans.
ATTORNEYS.

United States Patent Office 3,086,449
Patented Apr. 23, 1963

3,086,449
BUILT-IN BARBECUE UNIT
James W. Cahill, Covington, Ky., assignor to Nutone, Inc., Cincinnati, Ohio, a corporation of New York
Filed Apr. 17, 1961, Ser. No. 103,272
3 Claims. (Cl. 99—446)

This invention concerns a barbecue unit which is adapted to be built into cabinet structure such as a counter top cabinet of the type used in a kitchen. In such an installation, a hood and a blower to collect and to draw off smoke and cooking fumes is required. However, the unit is equally well adapted for use in an outdoor location where ventilation is not required and where, if desired, bricks or other materials may be employed to build supporting structure for the unit.

In the preferred embodiment of the unit, the grid upon which food is placed for cooking is at counter-top level. A box-like housing for the unit has a rim extending around the top thereof and this rim rests upon the counter top of the kitchen cabinet with the housing down inside of the cabinet. The top of the unit is therefore substantially flush with the counter top of the kitchen cabinet so as to not interfere with the normal use of the conuter top when the barbecue is not being used.

One objective of the invention has been to provide a barbecue unit which employs electrical heating elements so arranged that they may be adjusted toward and from the grid upon which food to be cooked is placed and further arranged so that they may be turned on selectively to provide a wide range of cooking heats.

A further objective of the invention has been to provide a unique device for catching the drippings which fall from foods being cooked upon the grid. If such drippings are caught in an ordinary, open receptical, they boil off, giving rise to objectionable odors and smoke. There is also the ever present danger of a flash fire. The device of this invention catches the drippings, but it protects them from the intense heat of the electrical heating elements so that they may cool and condense to a semi-solid state in which there is no smoking. Furthermore, the catcher is adapted to be cleaned easily in the kitchen sink.

Other objectives and features will be readily apparent to those skilled in the art from the following detailed description of the drawings in which:

FIGURE 3 is a fragmentary cross-sectional view taken on the line 3—3 of FIGURE 2 and illustrating the heating units of this invention in their lowermost position.

FIGURE 4 is a view similar to FIGURE 3 illustrating the heating units in their uppermost positions.

Figure 1:
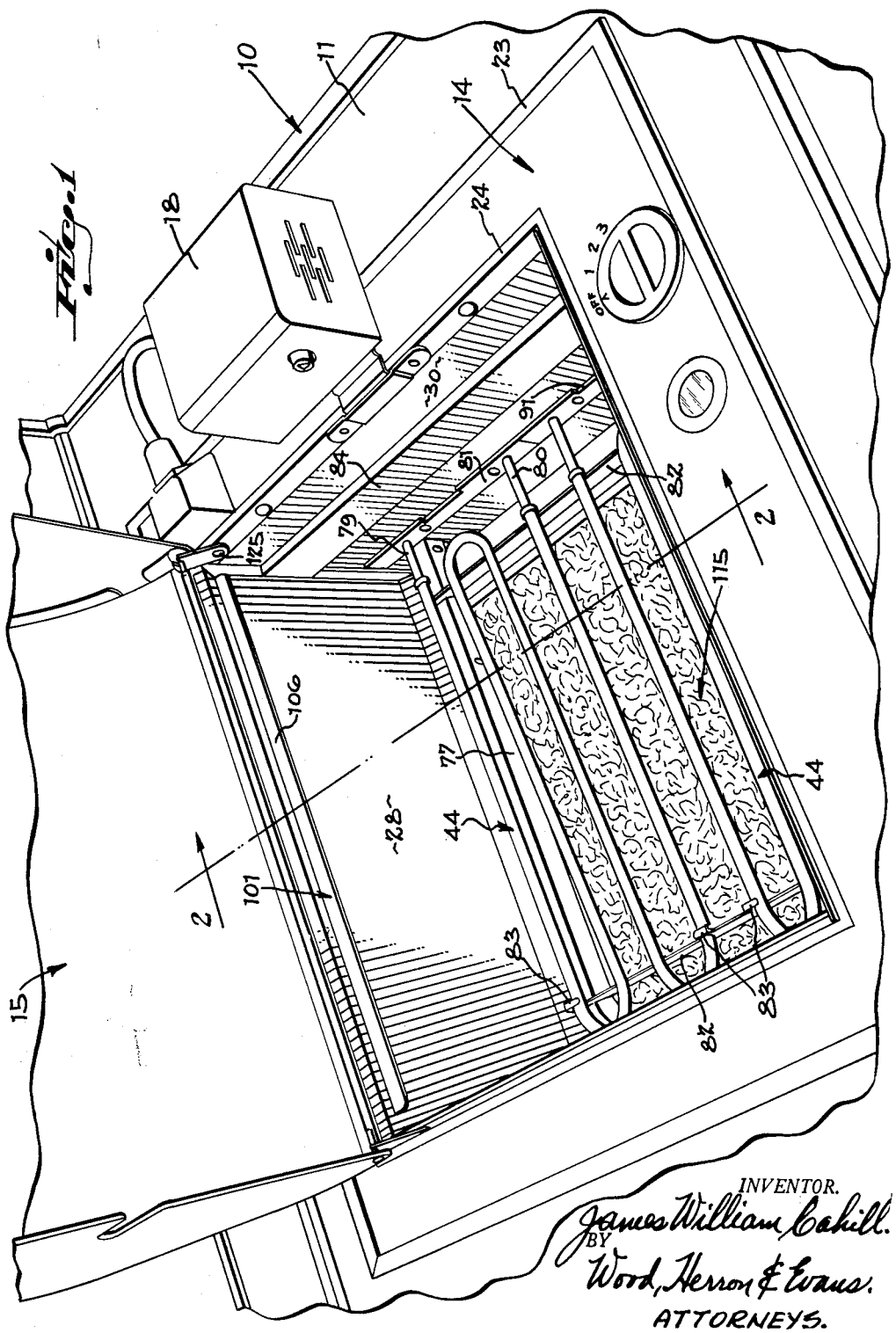
FIGURE 1 is a fragmentary perspective view looking down into the well of a barbecue unit embodying the principles of this invention.

In FIGURE 1 a kitchen cabinet is designated generally by the numeral 10. This cabinet is of standard construction having a counter type top 11. In order to make an installation of the type illustrated in FIGURE 1, the counter top is cut out to provide a rectangular opening (not shown) which is slightly larger than the dimensions of the rectangular housing, designated generally 13, which encloses the lower part of the unit. The housing and all of the components of the unit are suspended from a rim designated generally 14 which is also rectangular in outline, but which is larger in size than the housing so that it overhangs the four sides of the housing to rest on top of the counter top surrounding the opening. Various means may be utilized to secure the unit to the counter top. Since such expediencies are well-known, none are shown here. As shown in FIGURE 1, a rotisserie cover 15 and a motor 18 for a skewer, not shown, may be provided.

The housing 13 is essentially a square box made of sheet metal including a front wall 20, a rear wall 21 and two side walls 22—22. All four of these walls are flanged at the top and then spot welded or otherwise secured to the underside of the rim 14. Since all of the weight of the unit is borne by rim 14, it is preferred that it be configurated to provide a strengthening bead 23 which extends completely around its outer edge and another bead 24 which extends completely around its inner edge immediately surrounding the well inside the unit. It is also preferred that the outer edge have a downwardly turned flange 25 thereon and that the inner edge have a downwardly turned flange 26 thereon. It will be observed that the two beads 23 and 24 define a shallow trough between them which extends completely around the barbecue well, this providing a catch basin for spilled liquids, condensed juices, etc.

For insulation purposes, the housing has inner walls which parallel the outer walls and which are spaced therefrom on all sides by an amount substantially equal to the width of the rim. The inner wall at the front of the unit is designated 27, the inner rear wall 28, and the two inner side walls only one of which is shown at 30. The inner walls 27 and 28 at the front and back of the unit have flanges turned over at their upper edges as at 31—31 and these flanges are secured, as by welding, to the underside of the rim 14. The inner rear wall 28 comes all the way down to the bottom of the housing where its lower edge is fastened to a bottom plate, designated generally 32, which encloses the bottom of the housing. This plate is configurated at the back and two sides to form a structural beam to strengthen the unit. As may be seen in FIGURE 2, the front edge of bottom plate 32 is turned down to provide a plain, right angular flange 33. The two sides and rear on the other hand are turned down as at 34 and then outwardly as at 35 and then upwardly as at 36 to provide a chanel-like configuration, the side walls of which are formed by 34 and 36 and the web of which is formed by 35. The lower edge of inner rear wall 28 is fastened to the upright 34, whereas the lower edge of the outer rear wall 21 is fastened to the upright 36 of the channel-like configuration. The same type of construction is provided for the inner and outer sets of side walls as may be best seen in FIGURE 3.

The inner front wall is of somewhat different construction. The major area thereof does not extend all the way to the bottom of the housing inasmuch as access is provided to the inside of the lower part of the unit through the front wall. In this instance, the inner front wall comes down to a point roughly two-thirds of the way to the bottom and then it is turned toward the front of the unit as shown at 37, the forward, free edge of the part 37 of the wall being turned up to provide an L-shaped flange 38 to strengthen it. The space between part 37 of the inner wall 27 and the bottom plate 32 of the unit is acessible from the front of the unit through a door 39. This door is fastened to the flange 33 at the front of the bottom plate 32 of the housing by means of a hinge 40 so that it opens by swinging out and down. A simple catch may be employed to hold the door closed.

Figure 2:
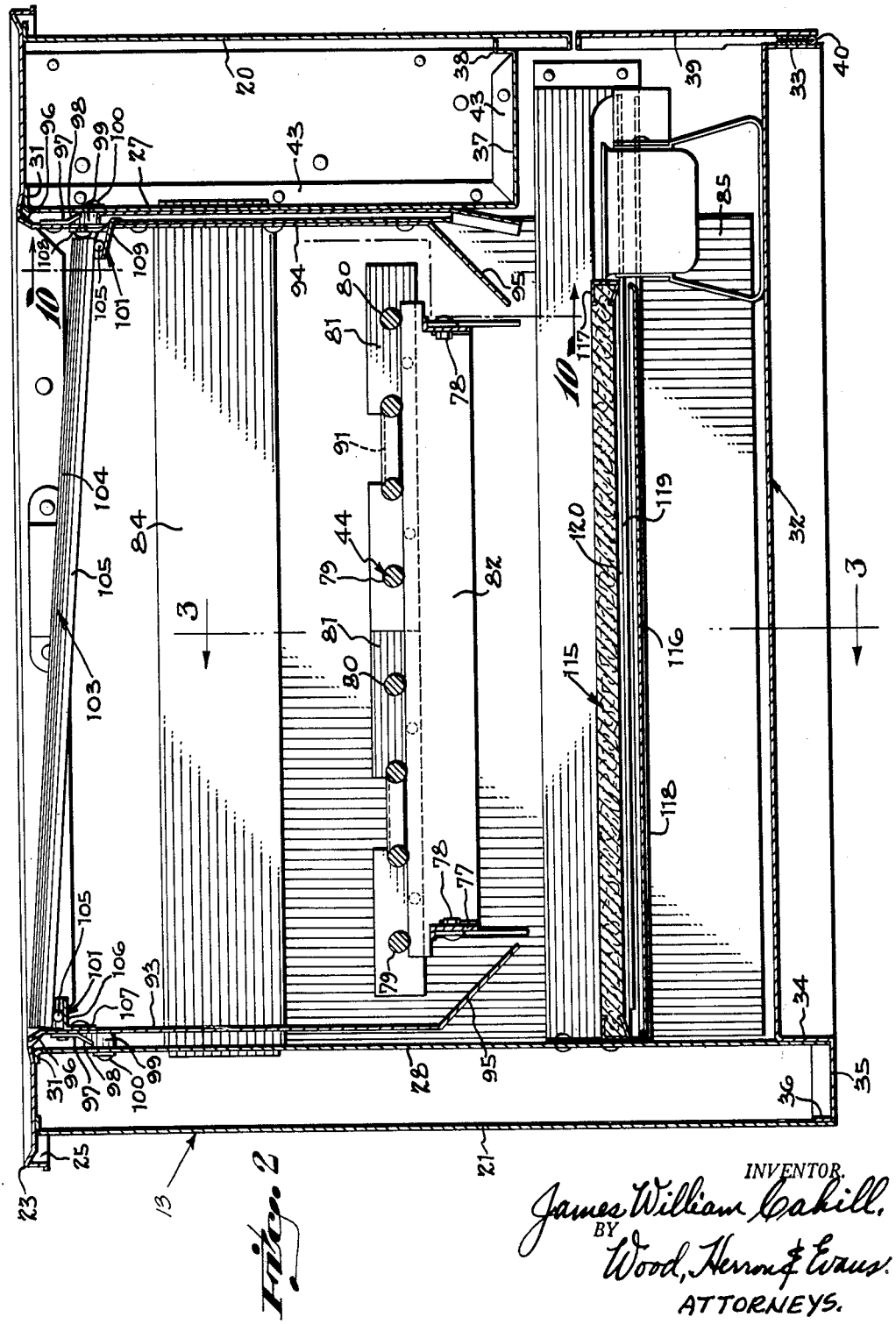
FIGURE 2 is a cross-sectional view taken on the line 2—2 of FIGURE 1.

The two ends of inner front wall 27 are flanged, as may be seen in FIGURE 2, as at 43—43 and these flanges riveted to the forward portions of inner side walls. The construction thus provided for the housing is both light in weight and unusually strong, insuring that the unit is not injured in handling prior to and during installation. Furthermore, the hollow wall construction insures that excessive amounts of heat are not transmitted to the kitchen cabinet.

As may be seen in FIGURE 1, two heating elements designated generally 44—44 are employed in the barbecue unit. There elements are supported in cantilever fashion from a mechanism located at the right side of the housing behind inner wall 30.

Referring now to FIGURE 3, an intermediate wall 45 is disposed between outer side wall 22 and inner side wall 30, this wall providing support for a pair of vertical tracks 46—46. The intermediate wall is flanged along its rear edge and along its forward edge and secured to the inner rear wall 28 at one end thereof and to the front wall 20 at the other end thereof. This fastening, as in the case of other flanges previously described, may be done by welding or riveting. The lower endwise portion of intermediate wall 45, best may be seen in FIGURES 3 and 4 as offset toward outer side wall 20 to provide space for a mount bracket 48 and an elevating screw assembly including a pair of crossed arms 50—50 which comprise a scissors linkage, of known construction. Bracket 48 is in the rear part of the housing being fastened to the intermediate wall by means such as rivets. The lower end of one of the crossed arms 50 is pivotally mounted on bracket 48 by means of a stud 51. The lower end of the other arm 50 of the pair is pivotally mounted by a similar stud to an elevating nut, not shown, of the screw assembly. The nut is threadingly engaged upon an elevating screw 54 and this screw is rotatably journalled between two brackets 55 and 56 which are secured to the lower endwise portion of intermediate wall 45 adjacent to the forward edge thereof. The elevating screw extends on through the journal bracket 56 and projects through a small opening 57 in front wall 20. The exposed end of the elevating screw is square and it receives a hand crank 58 which appears in FIGURE 1. Two cross arms 50—50 are pivotally interconnected at their centers by means of a stud 59, the two arms being offset in the areas of the stud so that the four ends of the two arms lie in the same vertical plane. It may be seen therefore that when elevating nut 53 is moved to the left as viewed in FIGURE 4, by turning the hand crank, the lower ends of the arms are brought toward one another which has the effect of raising the upper ends of the arms. Turning the crank in the opposite direction lowers the upper ends of the arms.

The two vertically arranged tracks 46—46 receive two slides. In each instance, the slide has a right angular base flange which engages under a similar flange on a track so that the base flange on the slide rides between the track flange and the adjacent interface of the intermediate wall 45. As shown, it is preferred that the slides be substantially long so as to decrease the possibility of binding within the track. As may best be seen in FIGURES 3 and 4, each slide has a vertical web portion 63 which projects at right angles away from intermediate wall 45, the two webs terminating just short of inner wall 30. As shown, the inner wall 30 has a substantially large rectangular opening 64 in it. This opening accommodates the cantilever mounting for the heating elements and it permits the raising and lowering of the elements by means of the scissors linkage.

The two slides are interconnected by means of a rigid cross beam 65. The beam is best illustrated in FIGURE 4. The two ends of the beam are turned at right angles back toward intermediate wall 45 to form flanges 66—66 by means of which the opposite ends of the beam may be fastened by rivets to the web portions 63—63 of the two slides. Both the upper and lower edges of cross beam 65 are turned over at right angles out away from intermediate wall 45 to provide an upper flange and a lower flange. These two flanges extend the full length of the beam. The upper end of the cross arm of the elevating mechanism which is toward the rear of the unit is pivotally fastened to the cross beam 65 by means of a stud 69 at a place substantially directly over the stud 51. The upper end of the other cross arm, not shown, which is toward the front of the unit, is slidably mounted within a horizontal slot cut through beam 65 by means of a similar stud. Slot 70 is as long as that part of the screw immediately below it on which the elevating nut travels. Thus, movement of the elevating nut is directly reflected in vertical movement of cross beam 65.

A pair of mount arms is carried by cross beams 65. One of these arms, designated 72, is located adjacent to the rear end of cross beam 65; whereas the other is located adjacent to the forward end thereof. Inasmuch as the latter support arm crosses the slot, a portion thereof over the slot is cut out as at 75 (see FIGURE 4) to permit stud 69 to move freely back and forth in slot. In both cases, support arms 72 have base tabs turned over at right angles and these tabs are securely riveted to the cross beam 65. As shown, the arms 72 project through the large rectangular opening 64 in end wall 30 and into the well of the unit. These two arms are securely fastened to a horizontally disposed, U-shaped frame 77 upon which the heating elements are mounted. Preferably, the U-shaped frame is L-shaped in cross section as may be seen in FIGURE 2. The horizontal part of this L configuration contacts the upper edges of the arm so that when bolts, shown at 78—78 are tightened into place, the U-shaped frame becomes a structural continuation of the two arms 72.

The heating elements that are utilized are of that type known as "Calrods," each rod being substantially tubular and each one being bent back and forth to provide four horizontal runs leaving two terminal ends 79 and 80 at the end of the well adjacent end wall 30. See FIGURE 1. These terminal ends are mounted in a base plate 81 in the case of each heating element. The heating elements themselves are supported above the frame 77 on cross members 82—82 which bridge the space between the two arms of the U-shaped frame. Tabs 83 struck up from cross member 82 at the outer ends of the heating elements may be bent over the top of the individual runs of the heating elements to hold them in place. The cross members may be secured to the frame by tabs, bolts, rivets or other known expediencies.

Returning again to FIGURES 3 and 4, two, interlocked panels are employed to prevent grease from spattering into the space between inner wall 30 and side wall 22. These panels are mounted one upon the other, the upper one being shown at 84 and the lower one being shown at 85. The lower panel is much larger than the upper one and it is secured to four tabs, each one of which is designated 86, which are turned up vertically from the forward edge of the upper flange of cross beam 65 at equally spaced intervals. The base plates 81—81 of the two heating elements are also secured to these upturned tabs, with rivets being used, the lower panel 85 being sandwiched between the base plate and the tabs. It may be seen therefore that the lower panel 85 moves with the heating element assembly.

The upper panel 84 is slidably mounted in vertical slots 87—87 which are located respectively in inner rear wall 28 and inner front wall 27. As may best be seen in FIGURES 3 and 4, both the upper and lower edges of upper panel 84 have lips on them, the upper one being shown at 88, the lower one being shown at 89. These lips turn toward inner wall 30. Additionally, the upper edge of lower panel 85 has a lip 90 on it which overlies lip 89 and actually rests upon it when the heating element assembly is in its lowermost position as shown in FIGURE 3. The two slots 87—87 come down only to a point to make possible the relationship of lips 89 and 90 shown in FIGURE 3. When in the lowermost position, the upper lip 88 along the top edge of upper panel 84 is substantially above the top of opening 64 in end wall 30 so that the two interlocking panels completely cover this opening. Now when the heating element assembly is raised, the lower interlocking panel 85 moves along with it until the underside of lip 89 on upper interlocking panel 84 makes contact with the edges 91 of the squared notches which appear in FIGURE 2 in the two base plates 81—81 of the heating elements. The lip 90 on the lower interlocking panel 85 therefore may be continuous, but the lip 89 on the upper interlocking panel 84 must be cut out to clear the upper edges of these base plates. Thus, when the heating element assembly is raised to a point to bring the edges 91 in the notched-out parts of base plates 81—81 into contact with lip 89, and elevation continues, the upper panel 84 of the two interlocking panels moves along with the heating element assembly up to the uppermost position of the assembly, this position being shown in FIGURE 4. On the return of the heating element assembly to its lowermost position, the upper panel 84 rides down until its lower edge, at the two ends thereof, comes to the bottoms of the grooves 87—87, at which time the upper panel 84 stops. The downward movement of the heating element assembly then continues until its lowermost position is reached at which time the two lips 89 and 90 come together. Therefore, at all times during the elevating and lowering movements, the two interlocking plates, collectively, prevent any spattering from passing through the large rectangular opening 64 in wall 30.

To assist in the assembly of the unit, it is suggested that means such as an access panel 92 be provided in intermediate wall 45 in the area thereof extending across the end of the unit immediately to the outside of the terminal ends of the heating elements. See FIGURE 4. Obviously, the electrical leads to the terminal ends of the heating elements must be through wires or other means which can flex with the raising and lowering movements of the heating elements. This poses no particular problem since such wires have adequate room for flexing movement in the space between end wall 30 and the intermediate wall 45. The wiring is not shown here, inasmuch as it is believed to be obvious to anyone skilled in the art how it should be arranged to work properly.

The inner rear wall 28 and the inner front wall 27 plus the inner side wall 29, which is opposite the elevating mechanism for the heating elements, are protected by three removable panels which are substantially of identical basic construction. Only two of these three walls are illustrated in the drawings, the one at the back being designated 93 and the one at the front being designated 94. As shown at 95, the front and back removable panels 93 and 94 have their lower endwise portions turned inwardly at approximately a 45 degree angle as shown at 95. The purpose of this angulation will be explained later. The lower edge of the wall of the removable panel at the left side of the unit may come straight down as in the case of the panel 85 which is opposite it. The upper ends of panels 93 and 94, plus the third panel which is at the left may be turned outwardly to provide angulated lips such as those shown at 96—96 in FIGURE 2. Furthermore, each of the three panels has a set of tabs, such as those shown at 97—97 in this figure, riveted to its rear face, each tab of the set having a tongue 98 at its lower end adapted to engage a wedge shape lug 99 fastened by means such as rivets 100 to the adjacent inner wall. The removable panels therefore may be simply lifted out of the well when it is desired to clean them.

The removable panel at the left side of the unit is substantially plain, however, the two at the front and back respectively carry shelves designated generally 101 in both instances which support grid members such as the one shown at 103 which, when in place, substantially cover the well. Each grid member comprises a plurality of rails 104, mounted in spaced parallel relation, and two cross rods 105 which are welded to the ends of the rails. For details of construction of these grids, attention is directed to copending patent application Serial No. 817,858, filed June 3, 1959. As shown in the copending application, it is preferred that the grids slant down toward one another from the sides, and also that they slant down from back to front. For this purpose, the two shelves 101—101 which are carried by removable panels 93 and 94 are arranged so that the back one is higher than the front one and they are also arranged to provide the other slant which places the midline where the two grid members join lower than the outer edges of these members. In each case, the shelf is made of sheet metal formed into an L configuration to provide at the rear a horizontally extending flange 106 and a vertical flange 107. The latter flange is riveted to the removable panel. It will be noted that flange 107 of the rear shelf is underneath the horizontal flange 106. At the front, this relationship is reversed and a vertical flange 108, which is riveted to removable panel 94 is above a flange 109 which is angulated such that it makes an acuate angle to the vertical flange 108. Furthermore, each shelf is bent at its center so that the two halves thereof, in the direction longitudinally thereof, slant upwardly from the center. The degree of slant in both instances is the same.

An important consideration in a barbecue unit of the type shown here is to prevent smoking as much as possible, and from the viewpoint of safety to prevent any flare-up of grease drippings. Toward this end, a novel grease catcher is employed comprising generally a rectangular mat 115 made of aluminum foil fibers, a shallow tray 116, and support means for these two elements to hold them horizontally in the bottom of the well underneath the heating elements. The mat 115 of aluminum foil fibers is identical in construction to the metallic filters which are used to entrap and filter grease in kitchen stove hood installations. Thus, it is not believed necessary to show the construction of the mat in detail here. It will be noted, however, that the mat is enclosed within a frame 117, preferably made of channel-shaped aluminum members, which extends around the four edges of the mat. The mat and tray are supported in slideways which are of identical construction and which extend across the bottom of the unit below the well in spaced parallel relation from front to back. Inasmuch as these slideways are identical, only one is shown in detail here, this being the one toward the right. This slideway is made of sheet metal having a bottom flange 118 which is simply turned over from the lower edge of the metal at a right angle, plus a second flange 119 which is stamped out of the sheet metal and turned over to parallel bottom flange 118. As shown in FIGURES 3 and 4, the two flanges provide a channel which is open at its side. The tray 116 is received in the channels of the two slideways and the aluminum foil mat simply rests on top of the upper one, 119, of the two flanges.

Although the foil mat is in rather close proximity to the tray, there is a slight air space between the two formed by angulating the frame on the underside of the mat as shown at 120 in FIGURES 3 and 4. It has been found that hot greases falling upon the mat are shielded in passing therethrough and substantially solidify upon reaching the underside thereof or in the event they pass on through to tray 116, they solidify or substantially solidify on contact with the tray. The insulating qualities of the metal foil very effectively prevent any of the greases from being heated to a point where they might possibly "flash" and thereby start a fire. Any grease that is on top of the mat must be at least in a very fluid state before reaching its flash point and in such a state it runs down through the fibers of the mat and in so running it moves into an area where it is protected from the direct rays of heat from the heating elements.

In order to clean the grease catcher the tray and the mat may be removed through the front door of the unit and taken to the kitchen sink. The mat may be very effectively cleaned by swishing it in a detergent solution. The tray may be cleaned as any other kitchen utensil. The removable panels may be cleaned the same way. It is found unnecessary to clean the "Calrods" inasmuch as they burn off any drippings which hit upon them.

Having described my invention, I claim:

1. In a barbecue unit, the combination comprising a plurality of electrical heating rods arranged in spaced parallel relation and a grease catcher disposed below said rods, said grease catcher comprising a mat of metal fibers superimposed over a tray.

2. In the combination of claim 1, said mat comprising a rectangular frame peripherally enclosing aluminum fibers.

3. In a barbecue unit having a well therein, the combination comprising a plurality of electrical heating rods arranged in spaced parallel relation within said well, slide means in the bottom of said well, a tray carried by said slide means, a mat of aluminum fibers mounted on said slide means immediately above said tray and constituting a grease catcher, and a door in said unit to provide access to said tray and said mat.

References Cited in the file of this patent

UNITED STATES PATENTS

| | | |
|---|---|---|
| 1,348,648 | Kelly | Aug. 3, 1920 |
| 2,114,698 | Babin | Apr. 19, 1938 |
| 2,720,827 | Del Francia | Oct. 18, 1955 |
| 2,763,200 | Kittler | Sept. 18, 1956 |
| 2,826,669 | Schmertz | Mar. 11, 1958 |
| 2,856,502 | Wolf | Oct. 14, 1958 |
| 2,898,846 | Del Francia | Aug. 11, 1959 |
| 2,903,549 | Joseph | Sept. 8, 1959 |
| 2,984,730 | Ostrom | May 16, 1961 |
| 2,992,315 | McDonnold | July 11, 1961 |